(12) United States Patent
West et al.

(10) Patent No.: US 7,439,210 B2
(45) Date of Patent: Oct. 21, 2008

(54) INHIBITIVE WATER-BASED DRILLING FLUID SYSTEM AND METHOD FOR DRILLING SANDS AND OTHER WATER-SENSITIVE FORMATIONS

(75) Inventors: Gary C. West, Spring, TX (US); Ernest Len Grebe, Cypress, TX (US); David Carbajal, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 325 days.

(21) Appl. No.: 10/831,668

(22) Filed: Apr. 24, 2004

(65) Prior Publication Data

US 2005/0239663 A1 Oct. 27, 2005

(51) Int. Cl.
C09K 8/12 (2006.01)
C09K 8/24 (2006.01)
(52) U.S. Cl. .................. 507/120; 175/65; 507/225; 507/925
(58) Field of Classification Search .................. 507/120, 507/225, 925
See application file for complete search history.

(56) References Cited

U.S. PATENT DOCUMENTS

| | | | |
|---|---|---|---|
| 3,909,421 A | 9/1975 | Gaddis | |
| 4,128,528 A | 12/1978 | Frisque et al. | |
| 4,391,925 A | 7/1983 | Mintz et al. | |
| 4,442,241 A | 4/1984 | Drake et al. | |
| 4,475,594 A | 10/1984 | Drake et al. | |
| 4,503,170 A | 3/1985 | Drake et al. | |
| 5,028,341 A | 7/1991 | Liao | |
| 5,076,373 A | 12/1991 | Hale et al. | |
| 5,134,118 A | 7/1992 | Patel et al. | |
| 5,424,284 A | 6/1995 | Patel et al. | |
| 5,454,668 A | 10/1995 | Liao | |
| 5,609,438 A | 3/1997 | Liao | |
| 5,735,349 A | 4/1998 | Dawson et al. | |
| 5,789,349 A | 8/1998 | Patel | |
| 5,908,814 A | 6/1999 | Patel et al. | |
| 5,955,401 A | 9/1999 | Liao | |
| 6,025,304 A * | 2/2000 | Southwell et al. | ........... 507/225 |
| 6,152,227 A | 11/2000 | Lawson et al. | |
| 6,156,819 A | 12/2000 | Lai et al. | |
| 6,355,600 B1 * | 3/2002 | Norfleet et al. | ............. 507/120 |
| 6,596,670 B1 | 7/2003 | Mueller et al. | |
| 6,818,596 B1 | 11/2004 | Hayes | |
| 2002/0128158 A1 | 9/2002 | Green | |
| 2002/0147113 A1 | 10/2002 | Green | |
| 2002/0155956 A1 | 10/2002 | Chamberlain et al. | |
| 2002/0160919 A1 | 10/2002 | Stowe, II et al. | |
| 2003/0236171 A1 | 12/2003 | Nguyen et al. | |
| 2004/0063588 A1 | 4/2004 | Rose et al. | |

FOREIGN PATENT DOCUMENTS

GB 1 547 951 7/1979

OTHER PUBLICATIONS

A. Zaitoun, and N. Benton, "Stabilization of Montmorillonite Clay in Porous Media by Polyacrylamides", SPE 31109, selected for presentation at the SPE Formation Damage Control Symposium held in Lafayette, Louisiana Feb. 14-16, 1996.
Arvind Patel, Emanuel Stamatakis, Steve Yound, and Steve Cliffe, "Designing for the Future—A Review of teh Design, Development and Testing of a Novel, Inhibitive Water-Based Drilling Fluid", AADE-02-DFWM-H0-33, prepared for presentation at theAADE 2002 Technical Conf. on "Drilling and Completion Fluids and Waste Management" held at the Radisson Astrodome, Houston, TX, Apr. 2-Mar. 2002.
Clay Grabber (trademark) Flocculant Product Data Sheet, Baroid, Product Service Line, Halliburton, Houston, Texas ( 2003).
GEM (trademark) 2000 Shale Stabilizer Product Data Sheet, Baroid, Product Service Line, Halliburton, Houston, Texas (2002).
GEM (trademark) CP Shale Stabilizer Product Data Sheet, Baroid, Product Service Line, Halliburton, Houston, Texas ( 2002).
GEM (trademark) GP Shale Stabilizer Product Data Sheet, Baroid, Product Service Line, Halliburton, Houston, Texas ( 2002).
Filter-Check (trademark) Filtration Control Agent, Baroid, Product Service Line, Halliburton, Houston, Texas ( 2002).
Barazan (Registered trademark) Viscosifier/Suspension Agent, Baroid, Product Service Line, Halliburton, Houston, Texas (2002).
Foreign communication from a related counterpart application dated Sep. 22, 2005.

* cited by examiner

*Primary Examiner*—Timothy J Kugel
(74) *Attorney, Agent, or Firm*—Craig W. Roddy; Karen Tripp

(57) ABSTRACT

An inhibitive water-based polymer mud system and method for using the system in drilling and in stabilizing wellbores is disclosed for use in water sensitive formations as an alternative to oil-based muds. The system comprises a non-ionic low molecular weight polyacrylamide in combination with a non-ionic high molecular weight polyacrylamide, preferably long chain alcohol and poly anionic cellulose.

50 Claims, 9 Drawing Sheets

INHIBITIVE WATER-BASED DRILLING FLUID SYSTEM AND METHOD FOR DRILLING SANDS AND OTHER WATER-SENSITIVE FORMATIONS

BACKGROUND OF THE INVENTION

1. Field of the Invention

The present invention relates to drilling fluids and methods useful in drilling boreholes in water-sensitive formations. More particularly, this invention relates to water based drilling fluids and methods useful for stabilizing water sensitive shale formations in oil and gas drilling operations.

2. Description of Relevant Art

For many years the oil industry has searched for effective or highly inhibitive water-based drilling fluids that could be successfully substituted for oil-based drilling fluids for use in drilling water-sensitive formations such as swelling or sloughing shales, salt, gypsum, anhydrite or other evaporate formations, hydrogen sulfide-containing formations, and hot (greater than about 300 degrees Fahrenheit ("° F.") holes. Although oil-based drilling fluids, most commonly invert emulsion fluids, have generally performed well as drilling fluids for such water-sensitive formations, water-based fluids are expected to be generally more economical and overall more readily compliant with environmental regulations. Moreover, in certain formations, water-based fluids are believed more suitable than oil-based fluids, even though such formations contain water-sensitive zones.

Shale hydration, however, commonly seen when ordinary water-based fluids are used in water-sensitive formations, is a significant cause of wellbore instability. Thus, any drilling fluid used in shales must exhibit minimal reactivity with the shales. That is, the water in the fluid should not cause swelling of the clays in the shales.

Various water-based systems have been tried with varying amounts of success. Potassium/PHPA (polymer) fluids are one example, but these generally cannot reach the inhibition levels of oil-based fluids in water-sensitive clays. Cationic polymer fluids are another example, but these tend to be incompatible with anionic drilling fluid additives and may sometimes have toxicity problems.

High molecular weight polyacrylamide polymers are commercially available and well known for their ability to impart borehole stability by inhibiting shale hydration. An example is CLAY GRABBER® product, a high molecular weight polyacrylamide material available from Halliburton Energy Services, Inc. in Houston, Tex. While helpful, high molecular weight polyacrylamide polymers still do not provide the wellbore and shale stability advantages of an oil based drilling fluid and cannot impart to a water based drilling fluid the lubricity and resistance to contaminants that an oil based drilling fluid typically has. Additionally, high molecular weight polyacrylamide polymers cannot impart to a water based drilling fluid the ability to achieve the fast penetration drilling rate in the formation that can be obtained with an oil based drilling fluid. There is still a desire for a water-based drilling fluid with improved performance in water-sensitive formations or zones that can approximate the performance advantages of an oil based drilling fluid.

SUMMARY OF THE INVENTION

The present invention is based on the discovery of certain aqueous-based drilling fluids with enhanced shale stabilizing properties. Non-ionic high and low molecular weight polyacrylamides provide the backbone of the fluids. These fluids further preferably comprise long chain alcohol(s) or polyol(s), and/or poly anionic cellulose. The combination of both the alcohol and poly anionic cellulose with the polyacrylamides is a synergistic combination that is most preferred to provide polymer water-based mud systems that synergistically retard shale hydration while also providing superior performance as a drilling fluid. Most preferably, the high molecular weight polyacrylamide is added in liquid or emulsion form and the low molecular weight polyacrylamide is added in powder form. The alcohol is typically in liquid form and the poly anionic cellulose is typically in powder form.

In one preferred embodiment, the present invention provides a method for drilling or stabilizing a downhole water-sensitive formation. The method comprises providing and/or using a drilling fluid comprising a non-ionic low molecular weight polyacrylamide, a non-ionic high molecular weight polyacrylamide, one or more long chain alcohols or polyols, and poly anionic cellulose in an aqueous base. In another preferred embodiment, the present invention provides a drilling fluid suitable for drilling water-sensitive formations and for stabilizing boreholes penetrating water-sensitive formations. The fluid is also useful in effecting or enhancing flocculation in aqueous drilling fluids. The fluid comprises a non-ionic low molecular weight polyacrylamide, a high molecular weight polyacrylamide and long chain alcohol(s) or polyol(s) and poly anionic cellulose in an aqueous base.

DETAILED DESCRIPTION OF PREFERRED EMBODIMENTS

Figure 1:
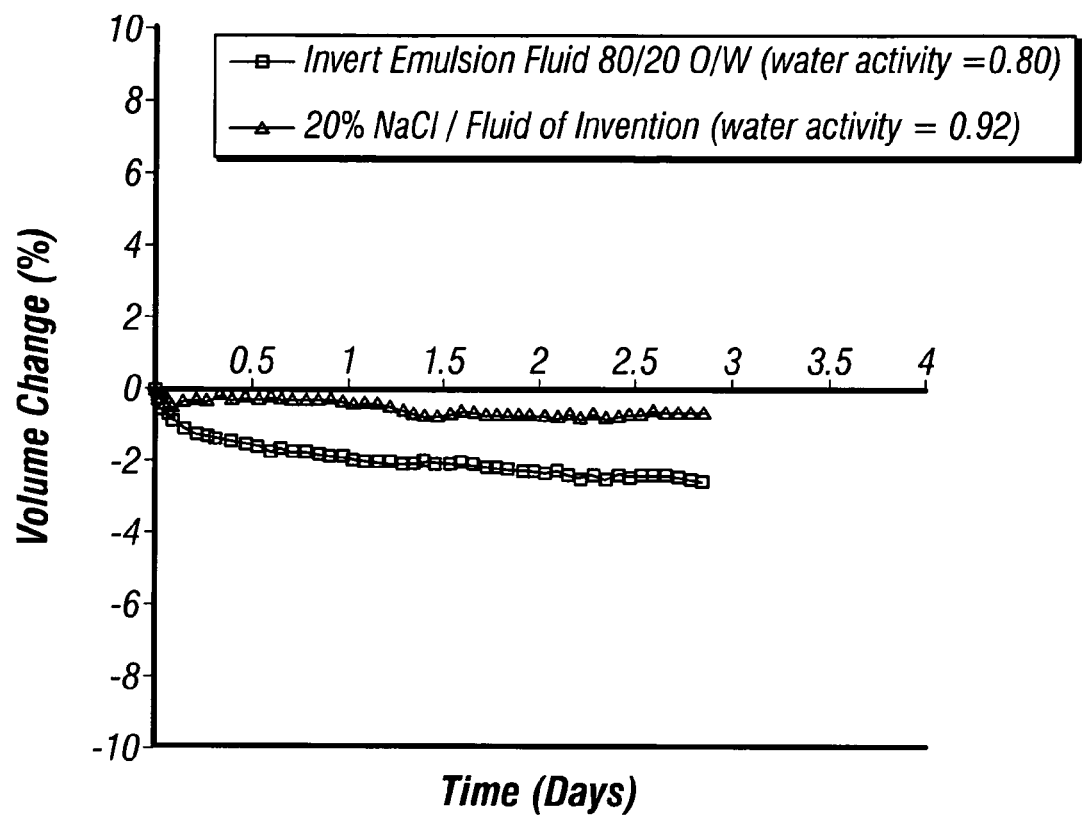
FIG. 1 is a graph comparing swellmeter data for an example aqueous-based drilling fluid of the invention with swellmeter data for an industry standard invert emulsion fluid.

In methods of the present invention, drilling of young shales and young, deep-water (offshore) hydratable formations may be conducted with an aqueous-based drilling fluid which inhibits gumbo attacks while affording more aggressive penetration rates than generally available with oil-based muds. Further, in methods of the invention, wellbore stability may be obtained, or a wellbore may be stabilized, using an aqueous-based drilling fluid even though the wellbore penetrates smectites, illites, and mixed layer clays.

The drilling fluid of the invention is an aqueous or water-based drilling fluid comprising non-ionic low molecular weight polyacrylamide, such as CLAY SYNC™ product available from Halliburton Energy Services, Inc. in Houston, Tex., and non-ionic high molecular weight polyacrylamide, such as CLAY GRABBER® product available from Halliburton Energy Services, Inc. in Houston, Tex. The drilling fluid of the invention further comprises most preferably both long chain alcohol(s) (or polyol(s)), such as the GEM™ products available from Halliburton Energy Services, Inc. in Houston, Tex., and poly anionic cellulose, although one or neither could alternatively less preferably be used.

Polyacrylamides most commonly used in the oil and gas industry (for fluid loss control) generally comprise at least about 30 weight percent acrylates. That is, the polyacrylamides commonly used are partially hydrolyzed. In contrast, however, in the present invention, non-hydrolyzed polyacrylamides are used because their non-ionic nature is desired. Most preferably, the high molecular weight polyacrylamide is in liquid or emulsion form and the low molecular weight polyacrylamide is in powder form and these polyacrylamides should always be in these preferred forms when used without addition of the long chain alcohol and/or the poly anionic cellulose. Other forms of the polyacrylamides, such as both the high and the low molecular weight polyacrylamides in liquid or emulsion form, or both the high and the low molecular weight polyacrylamides in powder form or the high molecular weight polyacrylamide in powder form and the low molecular weight polyacrylamide in liquid form, can result in mixing problems in the aqueous drilling fluid and/or can cause screen blind problems. The exact structures of the low molecular weight and high molecular weight non-ionic polyacrylamides are not believed critical, but these polyacrylamides should be non-ionic.

The long chain alcohol (or polyol) is typically in liquid form and preferably has a molecular weight in the range of about 200 to about 500. As used herein, reference to the term "long chain alcohol" (or "a long chain alcohol" or "long chain alcohol(s)") shall be understood to include one or more long chain alcohols as a combination of long chain alcohols may be as effective as a single long chain alcohol. The poly anionic cellulose is typically in powder form. Any or a combination of the several poly anionic celluloses readily available in the industry may be used.

Over time during use, i.e., during drilling, the high molecular weight polyacrylamide will shear or degrade to a lower molecular weight polyacrylamide, but generally a ratio of about two pounds of low molecular weight polyacrylamide per barrel of drilling fluid to about one-half pound of high molecular weight polyacrylamide per barrel of drilling fluid is preferred. About 4 to about 8 pounds (most preferably about 6 pounds) or about 2 to about 4% vol. of long chain alcohol (or polyol), and about 1 to about 2 pounds of poly anionic cellulose is preferably used per barrel of drilling fluid. In other words, the drilling fluid of the invention preferably comprises about 1-2 weight percent long chain alcohol (or polyol) and poly anionic cellulose, about 1-2 weight percent low molecular weight non-ionic polyacrylamide, and about 0.5 weight percent high molecular weight non-ionic polyacrylamide.

The low-molecular weight non-ionic polyacrylamide(s) preferably has a molecular weight in the range of about 500,000 to about 2 million. The high molecular weight non-ionic polyacrylamide(s) preferably has a molecular weight of about 4 million to about 8 million, although a weight as high as about 10 to about 15 million might alternatively be used. The exact preferred sizes of the polyacrylamides and long chain alcohol (or polyol) and poly anionic cellulose components of the drilling fluid of the invention may be modified with the varying pore size encountered in the formation such that the fluid is even more effective at "blocking off" the pores, during drilling for preventing ion transport and resulting hydration of the shales or other water-sensitive zones of the formation. In addition to forming a water blocking barrier preventing hydration of water-sensitive formations such as shales, the drilling fluid of the present invention advantageously aids in drill solids flocculation and removal from the mud system.

A typical formulation or composition of a drilling fluid system of the present invention is set forth in Table I below.

TABLE I

Aqueous base (preferably comprising about 6%-24% sodium chloride for hydrate suppression, less or no salts may be used if hydrate suppression is not needed)
High molecular weight non-ionic polyacrylamide (a primary polymeric encapsulator) (for example, CLAY GRABBER ® product, available from Halliburton Energy Services, Inc. in Houston, Texas) for smectite inhibition, flocculation of fine and mobile clays, and synergistic action with low molecular weight non-ionic polyacrylamide, long chain alcohol, and poly anionic cellulose to inhibit mixed layer clay hydration
Low molecular weight polyacrylamide (a primary polymeric inhibitor) (for example, CLAY SYNC ™ product, available from Halliburton Energy Services, Inc. in Houston, Texas) for illite inhibition and synergistic action with high molecular weight non-ionic polyacrylamide, long chain alcohol, and poly anionic cellulose to inhibit mixed layer clay hydration
Long Chain Alcohol (or Polyol) for synergistic action with high and low molecular weight non-ionic polyacrylamides to inhibit mixed layer clay hydration
Poly Anionic Cellulose for synergistic action with high and low molecular weight non-ionic polyacrylamides to inhibit mixed layer clay hydration
Viscosifier (for example, xanthan gum) to build gel strength and increase viscosity
Modified starch (for example, FILTER CHEK ™ product, available from Halliburton Energy Services, Inc. in Houston, Texas) for filtration control
Alkalinity control agent such as potassium hydroxide for alkalinity control (preferably keeping the fluid in the pH range of about 8.5 to about 10.0)
Density control agent such as barium sulfate (for example, BARITE ™ product, available from Halliburton Energy Services, Inc. in Houston, Texas) for density control Other additives may be used or some of the additives in Table I may be omitted as appropriate for the particular application or subterranean formation, provided that the fluid comprises at least high molecular weight non-ionic polyacrylamide and low molecular weight non-ionic polyacrylamide, and preferably also long chain alcohol (or polyol) and preferably also poly anionic cellulose, all in an aqueous base. The aqueous base is preferably comprised of salt water or brine, although fresh water may also be used.

When hydrate suppression is needed during drilling, formulating the aqueous drilling fluid of the invention with salts, such as for example sodium chloride, in addition to alcohols, most preferably long chain alcohols, along with the high and low molecular weight polyacrylamides is especially advantageous.

Laboratory and field tests were conducted with example fluids of the invention, some having the example composition set forth in Table II below.

TABLE II

Example Formulation

| | |
|---|---|
| Sodium Chloride | 24% |
| CLAY GRABBER ™ product (high molecular weight non-ionic polyacrylamide) | 0.5 ppb |
| CLAY SYNC ™ product (low molecular weight non-ionic polyacrylamide) | 2.0 ppb |
| GEM ™ product (long chain alcohol) | 2% |
| Poly Anionic Cellulose | 2 ppb |
| FILTER CHEK ™ product | 2.0 ppb |
| BARAZAN ® product | 1.0 ppb |
| Potassium Hydroxide | 0.5 ppb |
| BARITE ® product | As needed for desired density |

As used herein, ppb means pounds per barrel. All trademarked products are available from Halliburton Energy Services, Inc. in Houston, Texas The tests indicated that the fluid of the invention is useful for hydrate suppression in deepwater offshore drilling and also is useful in producing gauge holes in young or "active" formations. See, for example, the swellmeter data for this example formulation of a fluid of the invention compared with swellmeter data for an industry standard invert emulsion fluid, graphed in FIG. 1.

Figure 2:
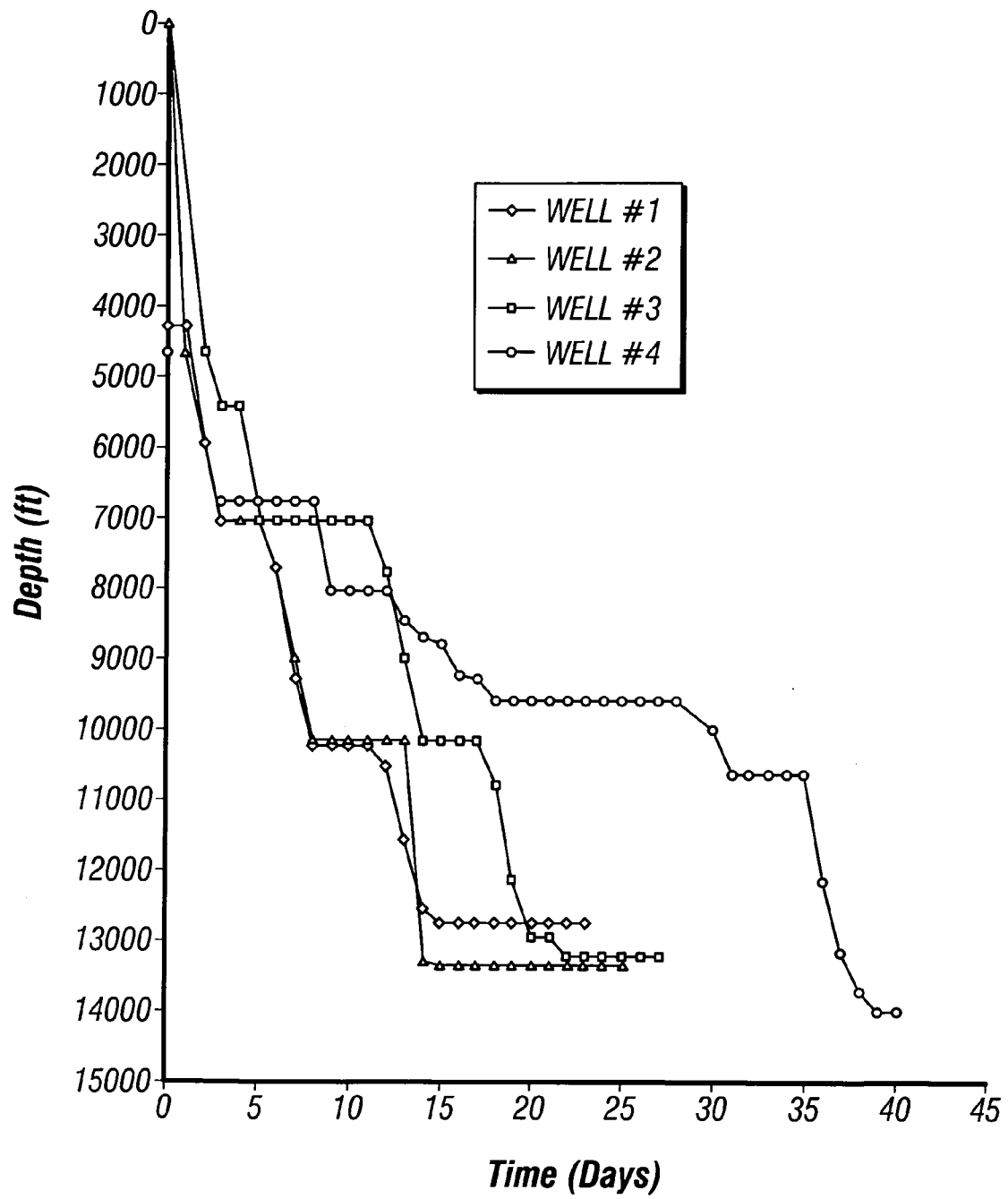
FIG. 2 is a graph showing the drilling rates of four different test wells, three using the fluid of the invention and one using-an invert emulsion fluid.
Figure 3:
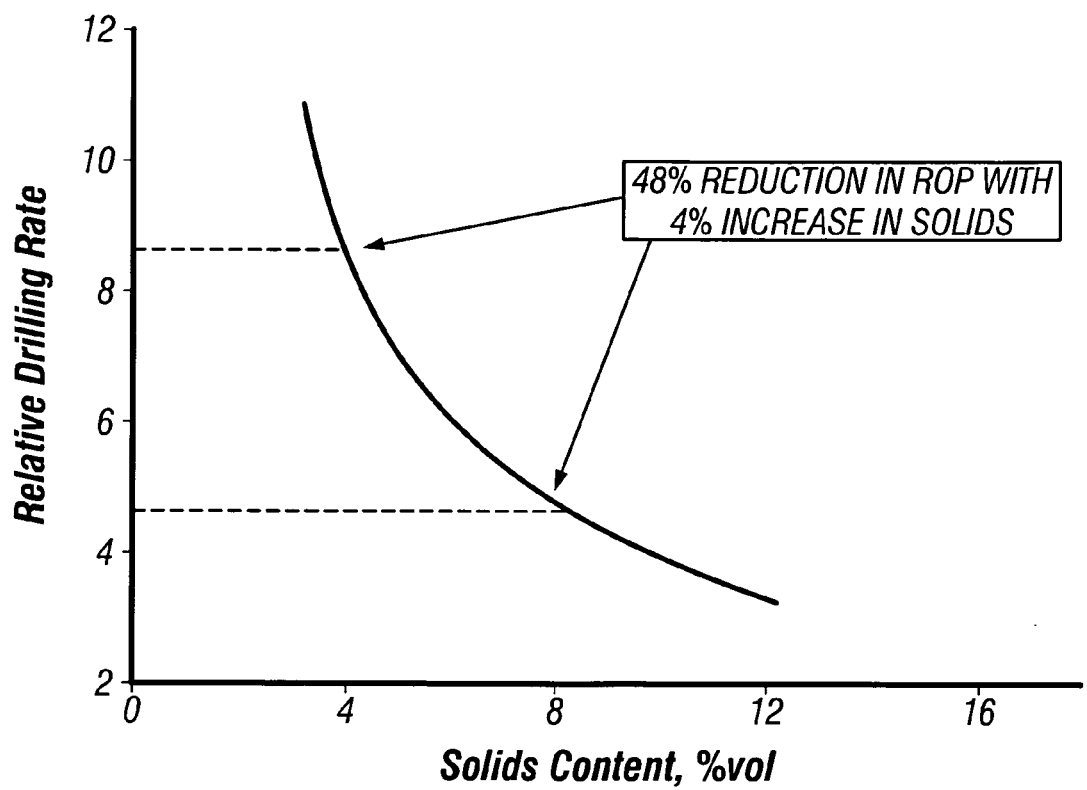
FIG. 3 is a graph showing the effect of solids in a drilling fluid on the penetration rate into a subterranean formation during drilling with an aqueous based drilling fluid without the benefit of the present invention.

The fluid is resistant to contaminants such as drill solids, cement, and acidic gases, and affords ease in mixing or preparation. The fluid is generally stable in temperatures ranging from about 30° F. to about 325° F. and provides good rheological properties, even in large deviated wellbores, without showing significant "sag" problems. The rate of penetration (ROP's) afforded with the fluid of the invention approaches those commonly seen with invert emulsion (oil-based) fluids. See, for example, FIG. 2 which shows the rates of penetration for three different test wells using example fluids of the present invention and one well using a commercially available invert emulsion fluid. FIG. 3 shows the effect of solids in a drilling fluid on the penetration rate into a subterranean formation during drilling with an aqueous based drilling fluid without the benefit of the present invention.

Without wishing to be limited by theory, it is believed that the mechanism that enables the drilling fluid of the present invention to achieve such favorable ROP's approximating those of invert oil emulsion based fluids is the ability of the fluid of the present invention to effect flocculation of the solids without adverse effects on the Theological properties of the fluid. The flocculation process allows for high surface area solids to be readily removed from the fluid. Such solids removal prevents interference of the solids with the properties of the drilling fluid and further prevents alteration of the drilling fluid by the solids.

Figure 4:
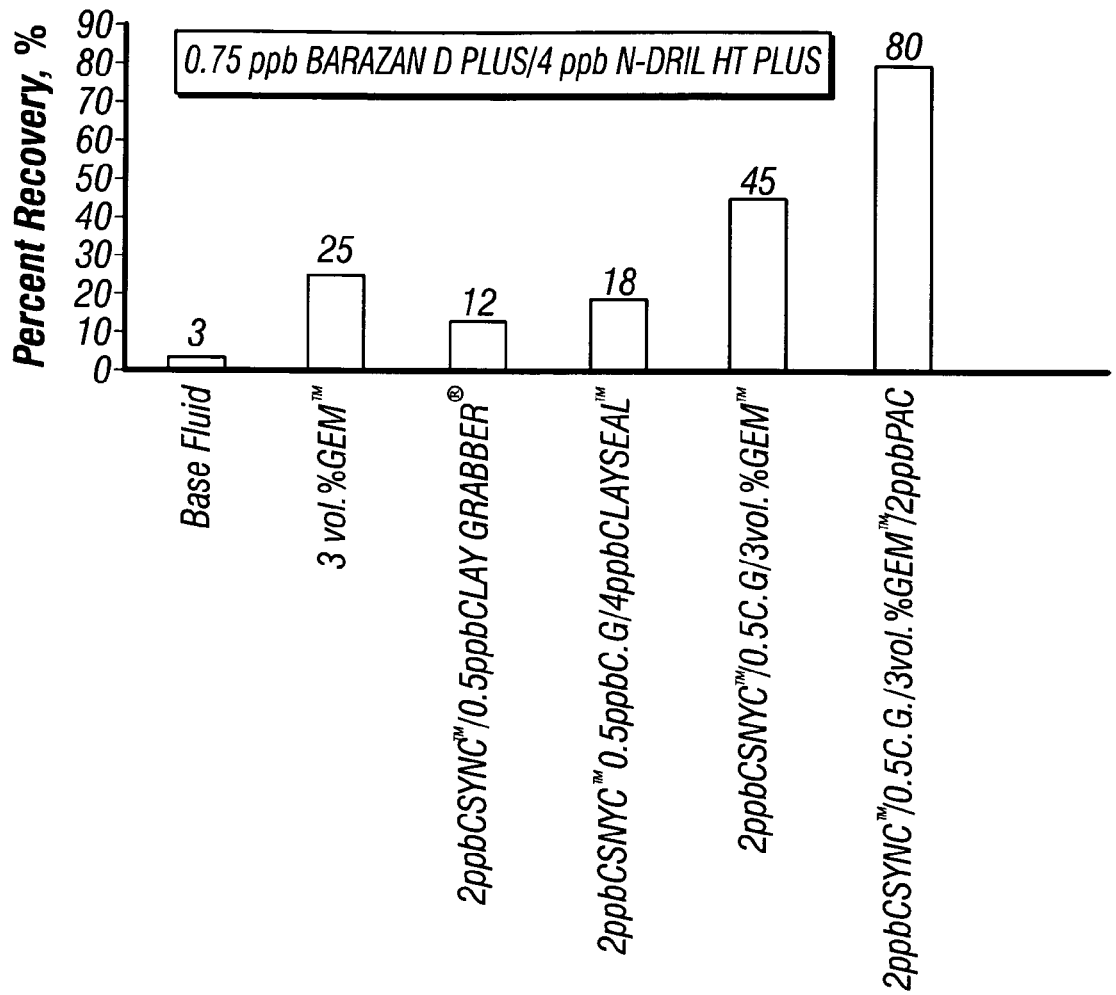
FIG. 4 is a graph comparing the shale recovery in Slake Durability Tests using certain various components of the fluid of the invention without others and in the synergistic combination of the invention.
Figure 5:
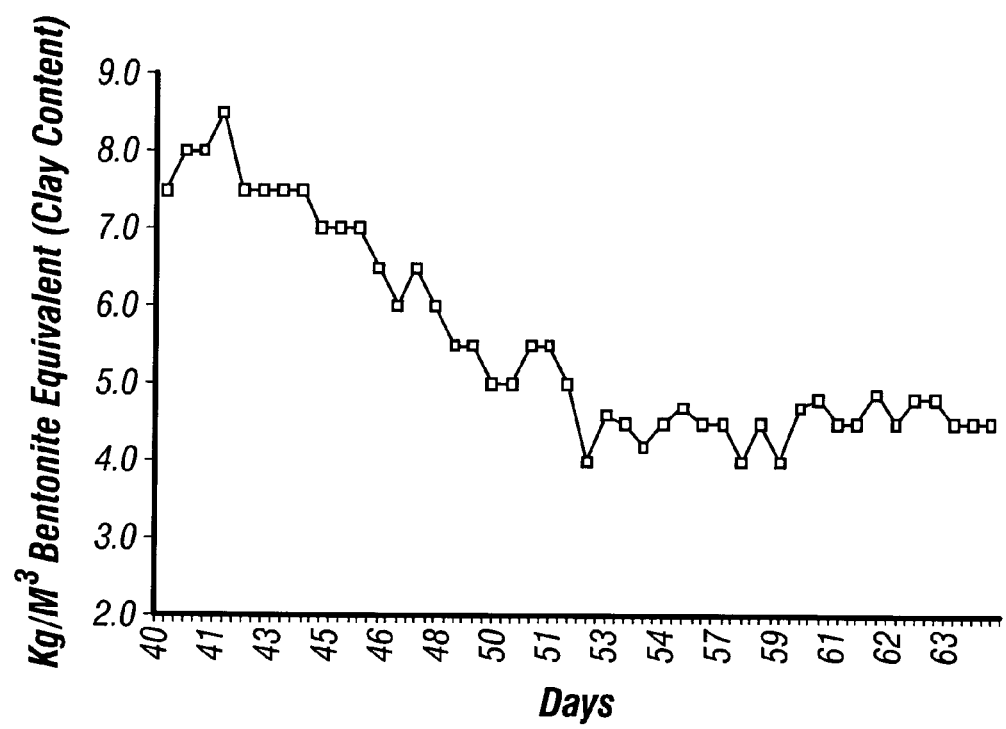
FIG. 5 is a graph showing the clay content in a fluid of the invention during an MBT test.

FIG. 4 compares the percent recovery of shales/drill cuttings using an aqueous fluid without the synergistic combination of the four additives of the present invention with aqueous fluids having one or more but not all of the additives, and then finally with an aqueous fluid containing all four additives, in a Slake Durability Test with London clay at ambient temperature with 11.0 ppg seawater muds. The tremendous benefit of the synergistic combination of high and low molecular weight polyacrylamides with long chain alcohol(s) and poly anionic cellulose in the aqueous fluid according to the present invention is clear, with an 80% recovery shown. That is, 80% of the shale remained "intact" or did not dissolve/disintegrate into the fluid when hot rolled in the fluid for an extended period of time. FIG. 5 is a graph showing the clay content in a fluid of the invention during an MBT test (Methylene Blue Test according to the API Standard Procedure for Testing Drilling Fluids). The minimal amount of clay in the fluid in this test is a strong indicator of the control and the ability of the fluid to inhibit the system as needed. Stability was maintained even after the temperature increased to 300° F. after day 53.

Figure 6:
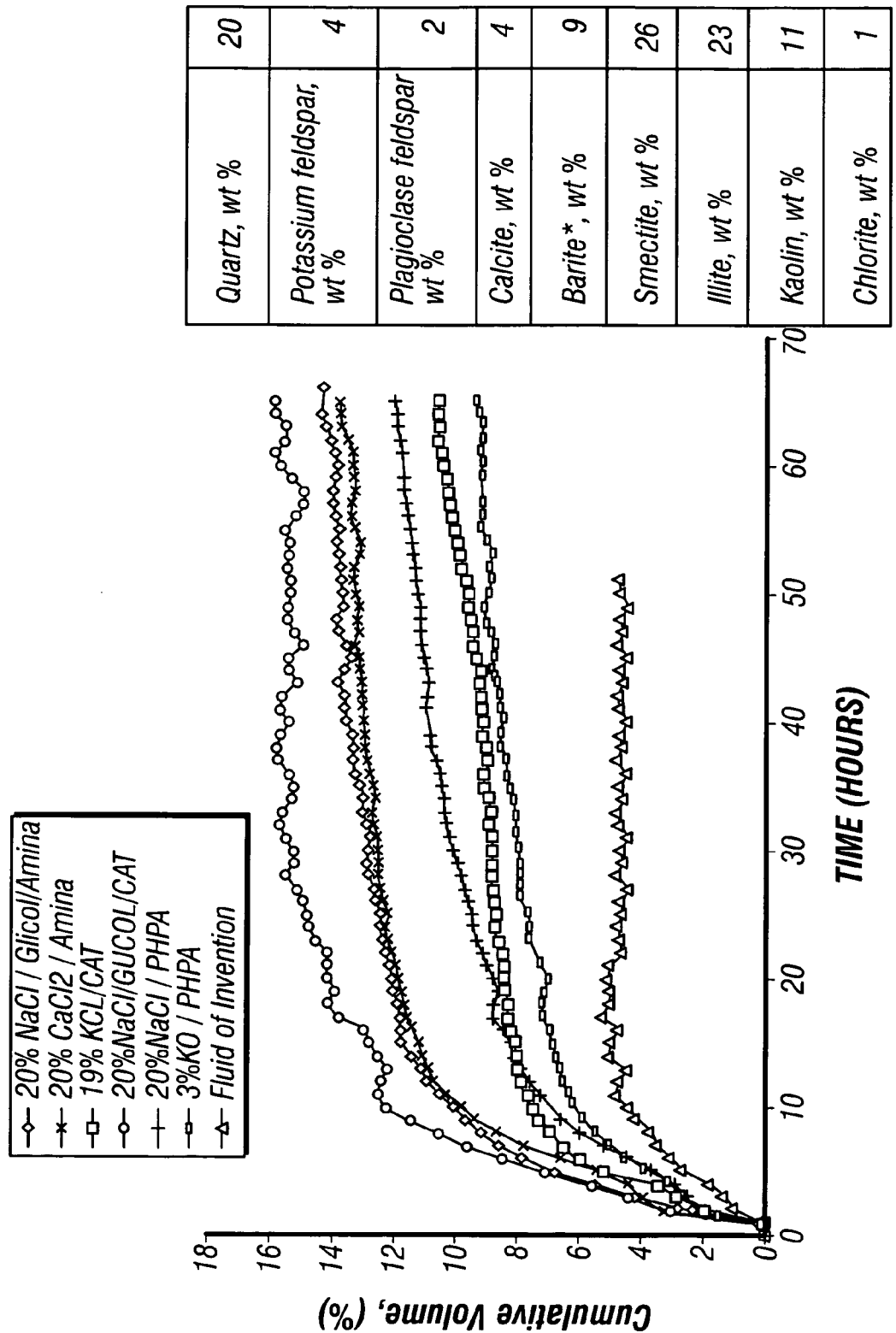
FIG. 6 is a graph comparing the effect (or lack of effect) of a fluid of the invention on reactive clays with the effect of prior art water based drilling fluids on reactive clays.
Figure 7:
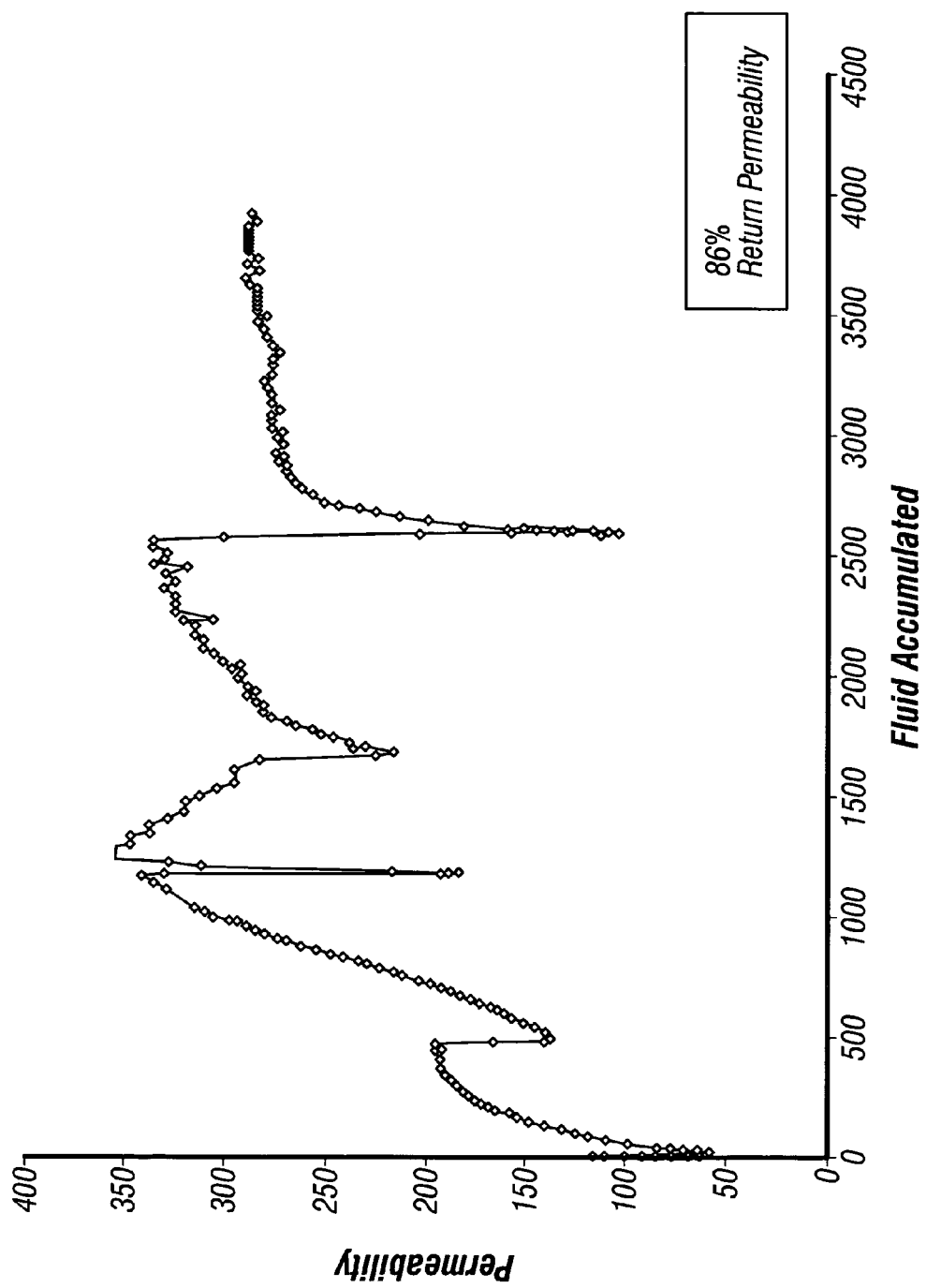
FIG. 7 is a graph of the results of a regain permeability test using a drilling fluid of the present invention in a well drilled through a hydrocarbon producing zone of a subterranean formation.

FIG. 6 is a graph comparing the effect (or lack of effect) of a fluid of the invention on reactive clays with the effect of prior art water based drilling fluids on reactive clays. The superiority of the fluid of the present invention to prior art aqueous based fluids is shown. FIG. 7 is a graph of the results of a "regain permeability test" using a drilling fluid of the present invention in a well drilled through a hydrocarbon producing zone of a subterranean formation. The test shows a regain permeability of 86%, further showing the ability of the fluid to avoid incorporation of undesirable solids.

Figure 8:
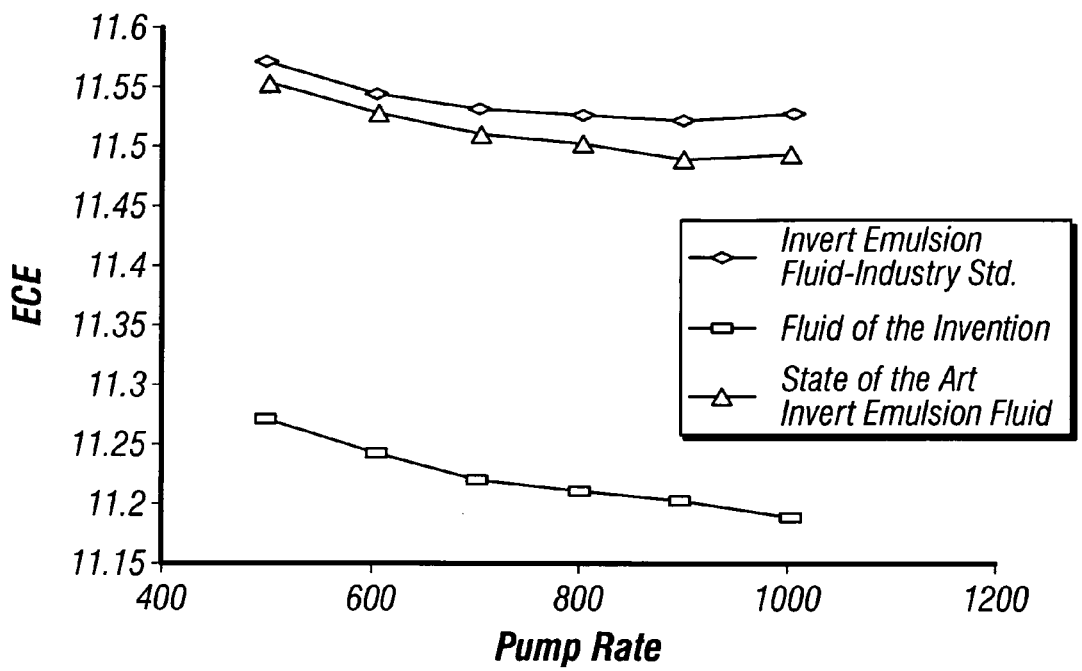
FIG. 8 is a graph comparing the ECDs of an example aqueous-based drilling fluid of the invention with the ECDs of an industry standard invert emulsion fluid and with a newer, advanced, "state-of-the-art" invert emulsion fluid.

The fluid of the invention also provides superior ECD's when compared to ECD's seen with invert emulsion fluids, which are more compressible than fluids of the invention. See, for example, the graph in FIG. 8 comparing the ECDs of the example formulation of a fluid of the invention set forth in Table II with an industry standard invert emulsion fluid and with a new and advanced "state-of-the art" invert emulsion fluid. The difference in a drilling fluid's measured surface density at the well head and the drilling fluid's equivalent circulating density downhole (as typically measured during drilling by downhole pressure-while-drilling (PWD) equipment) is often called "ECD" in the industry. Low "ECDs", that is, a minimal difference in surface and downhole equivalent circulating densities, is critical in drilling deep water wells and other wells where the differences in subterranean formation pore pressures and fracture gradients are small.

Figure 9:
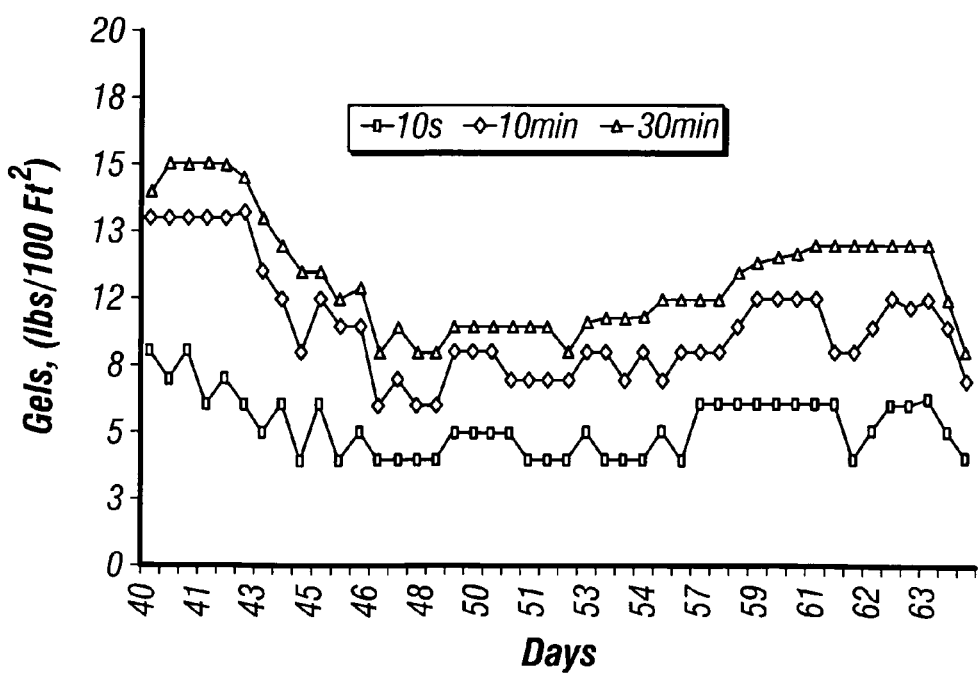
FIG. 9 is a graph showing gel strengths of a fluid of the invention over time.
Figure 10:
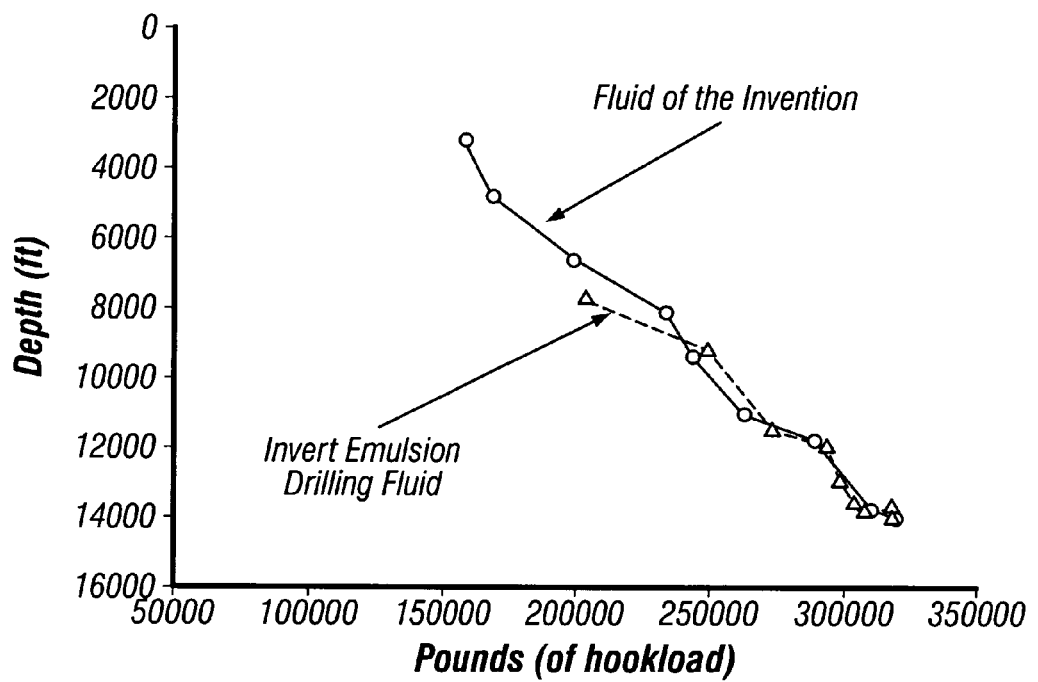
FIG. 10 is a graph comparing the drag while tripping in a well bore using a fluid of the invention with the drag using an industry standard oil based drilling fluid.

FIG. 9 is a graph showing gel strengths of a fluid of the invention over time. The behavior depicted indicates stable rheological properties, even after the temperature increased to 300° F. after day 53. FIG. 10 is a graph comparing the drag while tripping in a well bore using a fluid of the invention with the drag using an industry standard oil based drilling fluid. This graph indicates the fluid of the invention has good lubricity. While there are currently a number of lubricants commercially available for lending lubricity to aqueous based fluids, addition of such lubricants is not necessary with the fluid of the present invention which already provides the necessary amount of lubricity.

Table III below compares the rheological properties of the example formulation of a fluid of the invention set forth in Table II with the Theological properties of an industry standard invert emulsion fluid.

TABLE III

| | Temperature, °F. | | | | | | | |
|---|---|---|---|---|---|---|---|---|
| | 40 | 40 | 60 | 80 | 100 | 120 | 120 | 140 |
| | Pressure, phi | | | | | | | |
| | 0 | 2900 | 3500 | 4500 | 5500 | 0 | 6500 | 7500 |
| | FANN 75 Dial Readings | | | | | | | |
| A. FANN 75 RHEOLOGICAL PROPERTIES 11.0 LB/GAL WATER-BASED MUD | | | | | | | | |
| 600 rpm | 72 | 75 | 67 | 57 | 50 | 43 | 44 | 40 |
| 300 rpm | 47 | 51 | 45 | 39 | 34 | 28 | 28 | 26 |
| 200 rpm | 37 | 40 | 35 | 30 | 27 | 23 | 23 | 22 |
| 100 rpm | 26 | 27 | 23 | 21 | 19 | 18 | 15 | 14 |
| 6 rpm | 7 | 7 | 8 | 6 | 6 | 6 | 5 | 3 |
| 3 rpm | 7 | 6 | 6 | 6 | 5 | 5 | 4 | 3 |
| Plastic Viscosity, cP | 25 | 24 | 22 | 18 | 16 | 15 | 16 | 14 |
| Yield Point, lb/100 ft$^2$ | 22 | 27 | 23 | 21 | 18 | 13 | 12 | 12 |
| n | 0.643 | 0.597 | 0.656 | 0.607 | 0.609 | 0.642 | 0.693 | 0.647 |
| K | 0.826 | 1.205 | 0.690 | 0.843 | 0.713 | 0.469 | 0.348 | 0.441 |
| Tau 0, lb/100 ft$^2$ | 3.53 | 2.45 | 4.53 | 2.68 | 3.19 | 4.14 | 3.26 | 2.53 |
| B. FANN 75 RHEOLOGICAL PROPERTIES 11.0 LB/GAL PETROFREE ® SF, 80/20/SWR, 250,000 WPS | | | | | | | | |
| 600 rpm | 150 | 188 | 135 | 95 | 89 | 52 | 80 | 75 |
| 300 rpm | 93 | 115 | 82 | 62 | 60 | 35 | 56 | 55 |
| 200 rpm | 73 | 88 | 63 | 51 | 50 | 30 | 46 | 46 |
| 100 rpm | 51 | 59 | 43 | 37 | 36 | 24 | 35 | 35 |
| 6 rpm | 20 | 21 | 16 | 15 | 15 | 12 | 16 | 16 |
| 3 rpm | 19 | 21 | 15 | 15 | 15 | 1 | 16 | 16 |
| Plastic Viscosity, cP | 57 | 73 | 53 | 33 | 29 | 17 | 24 | 20 |
| Yield Point, lb/100 ft$^2$ | 36 | 42 | 29 | 29 | 31 | 18 | 32 | 35 |
| n | 0.785 | 0.795 | 0.814 | 0.697 | 0.651 | 0.699 | 0.629 | 0.546 |
| K | 0.606 | 0.731 | 0.454 | 0.690 | 0.886 | 0.337 | 0.900 | 0.512 |
| Tau 0, lb/100 ft$^2$ | 16.6 | 16.5 | 13.4 | 11.92 | 11.28 | 10.7 | 12.39 | 10.8 |

All trademarked products are available from Halliburton Energy Services, Inc. in Houston, Texas.

In a field test using the formulation set forth in Table II above, 86% return permeability was seen. The formation comprised about 31 wt % to about 38 wt % smectite and about 19 wt % to about 33 wt % illite. The average rate of penetration was about 100 to about 120 feet per hour with a peak rate of about 180 to about 200 feet to hour.

Advantages of the invention may be obtained by employing a drilling fluid (or drilling fluid system) of the invention in drilling operations, particularly drilling operations in swelling or sloughing shales, salt, gypsum, anhydrite or other evaporate formations, hydrogen sulfide-containing formations, and/or hot (greater than about 300° F.) holes. The drilling operations—whether drilling a vertical or directional or horizontal borehole, conducting a sweep, or running casing and cementing—may be conducted as known to those skilled in the art with other drilling fluids. That is, a drilling fluid of the invention is prepared or obtained and circulated through a wellbore as the wellbore is being drilled (or swept or cemented and cased) to facilitate the drilling operation. The drilling fluid removes drill cuttings from the wellbore, cools and lubricates the drill bit, aids in support of the drill pipe and drill bit, and provides a hydrostatic head to maintain the integrity of the wellbore walls and prevent well blowouts. The specific formulation of the drilling fluid in accordance with the present invention is optimized for the particular drilling operation and for the particular subterranean formation characteristics and conditions. For example, the fluid is weighted as appropriate for the formation pressures and thinned as appropriate for the formation temperatures. The sizes/molecular weights of the high molecular weight non-ionic polyacrylamide, the low molecular weight non-ionic polyacrylamide, the long chain alcohol (or polyol) and the poly anionic cellulose, may be adjusted for the pore size of the formation so that the fluid can better form an effective membrane against hydration of the water-sensitive zones as well as accomplish flocculation of drill solids and the usual functions of a drilling fluid such as sweep and transport of drill cuttings.

The foregoing description of the invention is intended to be a description of preferred embodiments. Various changes in the details of the described fluids and methods of use can be made without departing from the intended scope of this invention as defined by the appended claims.

What is claimed is:

1. A method of conducting a drilling operation in a subterranean formation having water-sensitive formations, said method comprising employing an aqueous-based drilling fluid comprising high molecular weight non-ionic polyacrylamide and low molecular weight non-ionic polyacrylamide wherein said high molecular weight non-ionic polyacrylamide has a molecular weight in the range of about 4 million to about 15 million and is added in liquid or emulsion form and said low molecular weight non-ionic polyacrylamide has a molecular weight in the range of about 500,000 to about 2 million and is added in powder form, said drilling fluid further comprising one or more long chain alcohols and polyanionic cellulose, such that said drilling fluid retards hydration of said water-sensitive formations while providing lubricity and stable rheological properties for drilling.

2. The method of claim 1 wherein said aqueous-base comprises about 0 wt. % to about 25 wt. % salts.

3. The method of claim 2 wherein said salts comprise sodium chloride.

4. The method of claim 1 wherein said long chain alcohols each have a molecular weight in the range of about 200 to about 500.

5. The method of claim 1 wherein the drilling fluid does not cause or contribute to formation instability or swelling of one or more components of said formation.

6. The method of claim 1 wherein the pH of said drilling fluid is maintained at about 8.5 to about 10.0.

7. The method of claim 1 wherein said low molecular weight non-ionic polyacrylamide and said high molecular weight non-ionic polyacrylamide are present in said fluid in a ratio of about 4 to about 1.

8. The method of claim 1 wherein said rheological properties of the fluid are stable over temperatures ranging from about 30° F. to about 325° F.

9. The method of claim 1 wherein said drilling operation is offshore.

10. The method of claim 1 wherein said drilling operation is drilling a wellbore.

11. The method of claim 1 wherein said drilling operation comprises drilling through at least one producing zone in said formation.

12. The method of claim 1 wherein said drilling operation is completing a wellbore.

13. The method of claim 1 wherein said drilling operation comprises running casing and cementing a wellbore.

14. The method of claim 1 wherein said drilling operation comprises conducting a sweep of a wellbore penetrating said formation.

15. The method of claim 1 wherein said fluid is stable over temperatures ranging from about 30° F. to about 325° F.

16. A method for stabilizing a shale formation, said method comprising employing an aqueous-based drilling fluid, said drilling fluid comprising non-ionic polyacrylamide having a molecular weight in the range of about 500,000 to about 2 million and added in powder form, non-ionic polyacrylamide having a molecular weight in the range of about 4 million to about 15 million and added in liquid or emulsion form, at least one long chain alcohol, and poly anionic cellulose, such that said drilling fluid exhibits minimal reactivity with the shale so that permeability in said formation is substantially maintained.

17. A method for stabilizing a shale formation, said method comprising employing an aqueous-based drilling fluid comprising low molecular weight non-ionic polyacrylamide having a molecular weight in the range of about 500,000 to about 2 million and high molecular weight non-ionic polyacrylamide having a molecular weight in the range of about 4 million to about 15 million, and further comprising both one or more long chain alcohols and poly anionic cellulose, such that said drilling fluid exhibits minimal reactivity with the shale.

18. The method of claim 17 wherein said aqueous-base of said drilling fluid comprises about 0 wt. % to about 25 wt. % salts.

19. The method of claim 18 wherein said salts comprise sodium chloride.

20. The method of claim 17 wherein the ratio of low-molecular weight non-ionic polyacrylamide to high-molecular weight non-ionic polyacrylamide in said fluid is about 4:1.

21. The method of claim 17 wherein clays in said shale do not swell.

22. The method of claim 17 wherein said long chain alcohols each have a molecular weight in the range of about 200 to about 500.

23. The method of claim 17 further comprising maintaining the pH of said drilling fluid at about 8.5 to about 10.0.

24. The method of claim 17 wherein said formation is offshore.

25. The method of claim 17 wherein said fluid is stable over temperatures ranging from about 30° F. to about 325° F.

26. An aqueous-based drilling fluid comprising a high-molecular weight nonionic polyacrylamide having a molecular weight range of about 4 million to about 15 million, a low-molecular weight nonionic polyacrylamide having a molecular weight range of about 500,000 to about 2 million, at least one long chain alcohol, and poly anionic cellulose, wherein said high-molecular weight non-ionic polyacrylamide is added in liquid or emulsion form and said low-molecular weight non-ionic polyacrylamide is added in powder form, such that said fluid when used in drilling provides lubricity, stable rheological properties over temperatures ranging from about 30° F. to about 325° F., and minimal reactivity with water-sensitive formations.

27. The drilling fluid of claim 26 wherein said aqueous-base comprises about 0 weight percent to about 25 weight percent salts.

28. The drilling fluid of claim 27 wherein said salts comprise sodium chloride.

29. The drilling fluid of claim 26 wherein said low-molecular weight nonionic polyacrylamide and said high-molecular weight nonionic polyacrylamide are present in said drilling fluid in a ratio of about 4 to about 1.

30. The drilling fluid of claim 26 wherein said long chain alcohols and/or poly anionic cellulose comprise about one to about two weight percent of said fluid.

31. The drilling fluid of claim 26 wherein said long chain alcohols have a molecular weight of about 200 to about 500.

32. The drilling fluid of claim 26 wherein the pH is maintained at about 8.5 to about 10.0.

33. A method for preventing hydration of a water sensitive formation during drilling a borehole in said formation, said method comprising employing an aqueous based drilling fluid during said drilling wherein said drilling fluid comprises high molecular weight non-ionic polyacrylamides having a molecular weight in the range of about 4 million to about 15 million, low molecular weight non-ionic polyacrylamides having a molecular weight in the range of about 500,000 to about 2 million, one or more long chain alcohols, and polyanionic cellulose, and was prepared with liquid or emulsion form of said high molecular weight non-ionic polyacrylamides and powder form of said low molecular weight non-ionic polyacrylamides, such that the formation does not become hydrated during the drilling.

34. The method of claim 33 wherein the aqueous-base of said drilling fluid comprises about 0 weight percent to about 25 weight percent salts.

35. The method of claim 34 wherein said salts comprise sodium chloride.

36. The method of claim 33 wherein said polyacrylamides are sized so that an effective water blocking barrier is formed on said borehole wall inhibiting ion transport from said formation.

37. The method of claim 33 wherein at least one of said polyacrylamides, said alcohols and said cellulose are sized so that an effective water blocking barrier is formed on said borehole wall inhibiting ion transport from said formation.

38. The method of claim 33 wherein the fluid does not substantially react with or affect the permeability of said formation.

39. The method of claim 33 wherein the pH of said drilling fluid is maintained at about 8.5 to about 10.0.

40. The method of claim 33 wherein said long chain alcohols have a molecular weight of about 200 to about 500.

41. The method of claim 33 wherein said low-molecular weight nonionic polyacrylamide and said high-molecular weight nonionic polyacrylamide are present in said fluid in a ratio of about 4 to about 1.

42. The method of claim 33 wherein said low-molecular weight non-ionic polyacrylamide comprises about 1 to about 2 wt. % of said drilling fluid, said long chain alcohols and/or poly anionic cellulose comprise about 1 to about 2 wt. % of said drilling fluid, and said high-molecular weight non-ionic polyacrylamide comprises about 0.5 wt. % of said drilling fluid.

43. The method of claim 33 wherein said ion transport is inhibited in an amount sufficient to prevent hydration of water-sensitive zones in said formation.

44. The method of claim 33 wherein said drilling fluid enhances flocculation of drill solids.

45. A method for preventing formation of gas hydrates in a borehole, said method comprising using an aqueous fluid comprising a combination of low molecular weight non-ionic polyacrylamide having a molecular weight in the range of about 500,000 to about 2 million and high molecular weight non-ionic polyacrylamide having a molecular weight in the range of about 4 million to about 15 million, one or more long chain alcohols each having a molecular weight in the range of about 200 to about 500 and salts, such that gas hydrates are not formed.

46. The method of claim 45 wherein said salts comprise sodium chloride.

47. The method of claim 45 wherein said aqueous fluid comprises about 6 wt % to about 25 wt % salts.

48. The method of claim 45 wherein the fluid is stable over temperatures ranging from about 30° F. to about 325° F.

49. The method of claim 45 wherein said borehole is offshore.

50. The method of claim 45 wherein said fluid has minimal reactivity with the formation surrounding said borehole.

* * * * *